INVENTOR.
WILLIAM S. SHIRA
BY
Lieber & Nilles
ATTORNEYS

March 7, 1967  W. S. SHIRA  3,307,699
SCREEN TENSIONING DEVICE
Filed April 17, 1964  2 Sheets-Sheet 2
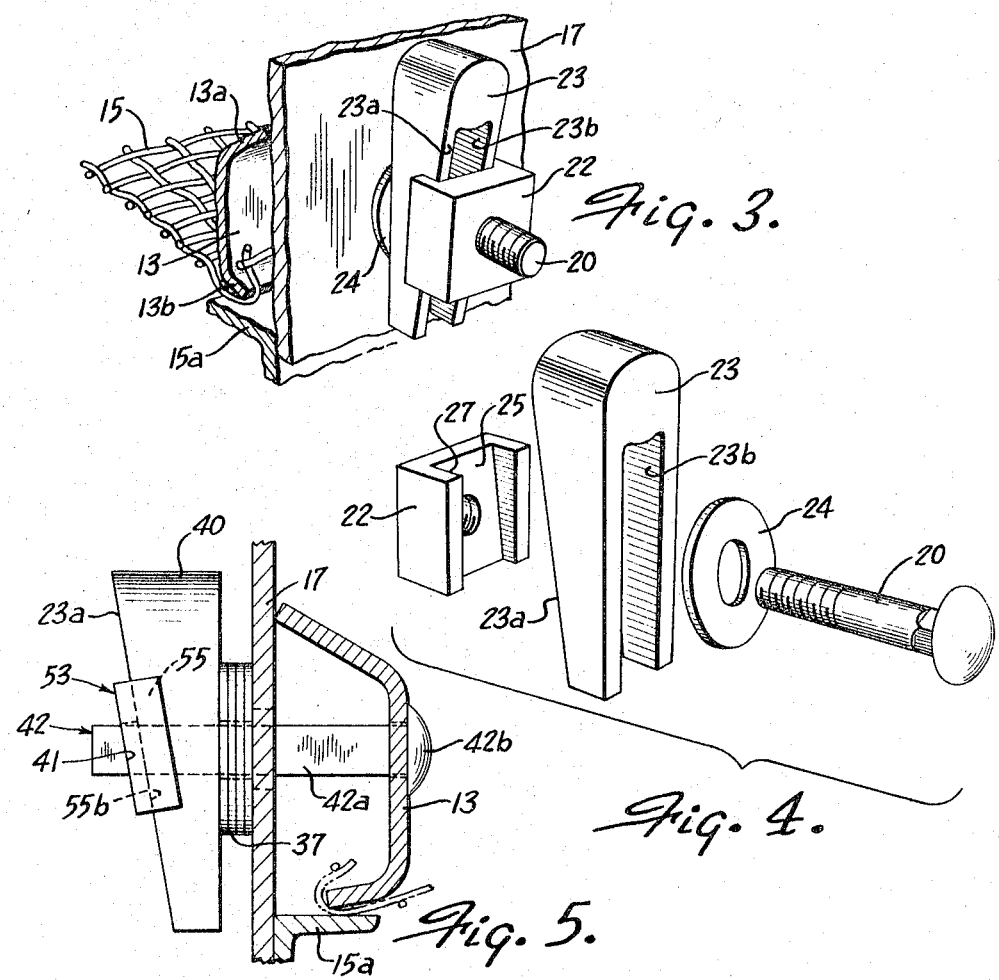
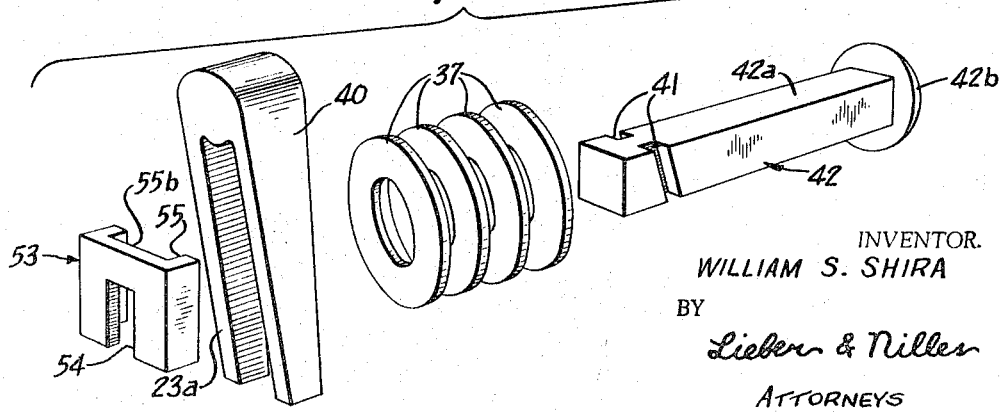
INVENTOR.
WILLIAM S. SHIRA
BY
Lieber & Nilles
ATTORNEYS

3,307,699
SCREEN TENSIONING DEVICE
William S. Shira, Brookfield, Wis., assignor to Barber-Greene Company, a corporation of Illinois
Filed Apr. 17, 1964, Ser. No. 360,541
9 Claims. (Cl. 209—403)

This invention relates to screening apparatus, and it relates more particularly to improved instrumentalities for securing a screen to the framework of the screening apparatus, whereby the screen may be effectively supported and readily tensioned.

A primary object of the invention is to provide a tensioning device for a screen wherein a novel and improved wedging member is interposed between an adjustable member and the supporting framework of the machine.

Various types of prior screen tensioning devices for screening apparatus have been heretofore proposed. The primary concern of the prior art devices has been the problem of providing a suitable effective fastening and tensioning device for the screens of vibratory screening apparatus wherein the apparatus is subjected to considerable shaking or vibratory motion. In such devices, it is essential that the screen fastening and tensioning means must maintain the proper screen tension, and yet allow for the facile replacement of screens as wear or damage occurs. The primary objections to prior tensioning devices have been due to the fact that the fastening and tensioning mechanism has been such as to render adjustments and the like difficult and time consuming.

Furthermore, prior tensioning devices have not been entirely effective in preventing loosening of the screen fasteners by reason of the vibratory action, thus necessitating frequent attention to maintain the proper amount of screen tension.

The present invention embodies an improved screen tensioning device in which a fastener member secures a screen to the main frame of the screening apparatus in such a manner as to allow a bifurcated wedge to be driven between a shoulder forming portion of said fastener member and said main frame to thereby secure and apply tension to the screen.

In one embodiment of the invention the fastener device is in the nature of a bolt having a threaded shank for receiving a nut threadably engaged therewith for adjustment toward and away from said main frame to provide a predetermined spacing between the nut and said frame so that a bifurcated wedge can be driven between the nut and the frame to fasten and tension the screen. The screen may also be readily removed from the screening apparatus by driving the wedge away from the bolt shank and out from its position between the nut and the frame to thereby loosen the tension. Reinstallation of a new or repaired screen may thereupon be easily made, and the wedge may again be driven over the shank to fasten and tension the screen. If further adjustments are required from time to time in order to properly tension the screen, the nut may be readily adjusted along the shank of the bolt to provide the correct spacing for receiving the bifurcated wedge, and the wedge may again be inserted over the shank and wedged between the nut and the frame to complete the fastening and tensioning of the screen. With this improved device, the screen is held securely at the proper tension regardless of the vibratory action of the screening apparatus, and the invention also contemplates the use of washers or shims as the adjustment means in lieu of the threaded stud and adjustable nut.

Thus the screen tensioning and fastening device of the invention overcomes the disadvantages of prior devices intended for like purpose, and the improved devices may be manufactured at relatively low cost.

It is another object of the invention to provide an improved fastening and tensioning device for a screen which is readily manipulatable for proper adjustment to maintain a predetermined screen tension.

It is a further object of the invention to provide an improved wedge holding and tensioning device for quickly and efficiently securing and tensioning a screen within the framework of a screening apparatus.

It is still another object of the invention to provide an improved, quickly applicable wedge for a screen fastening and tensioning device together with a readily adjustable means for receiving a portion of said wedge.

These and other objects and advantages of the invention will become apparent from the following detailed description.

A clear conception of the several features constituting the present invention and of the mode of constructing a fastening and tensioning device for a screen embodying the invention may be had by referring to the drawings accompanying and forming a part of this specification, wherein like reference characters designate the same or similar parts in the various views.

FIGURE 3 is an enlarged fragmentary view in perspective of the fastening and tensioning device of FIGURE 1;

FIGURE 4 is an exploded view of the screen tensioning and fastening device of FIGURES 1, 2 and 3;

FIGURE 5 is another fragmentary sectional view showing a modification of a screen fastening and tensioning device similar to that shown in FIGURES 1 to 4, inclusive, but with washers or shims used as the adjusting means; and FIGURE 6 is an exploded view of the device of FIGURE 5.

While the improvements have been illustrated and described as being especially advantageously embodied in a screening apparatus of a particular type, it is not intended to thereby unnecessarily limit or restrict the invention. It is also contemplated that certain descriptive terminology used herein shall be given the broadest possible interpretation consistent with disclosure.

Figure 1:
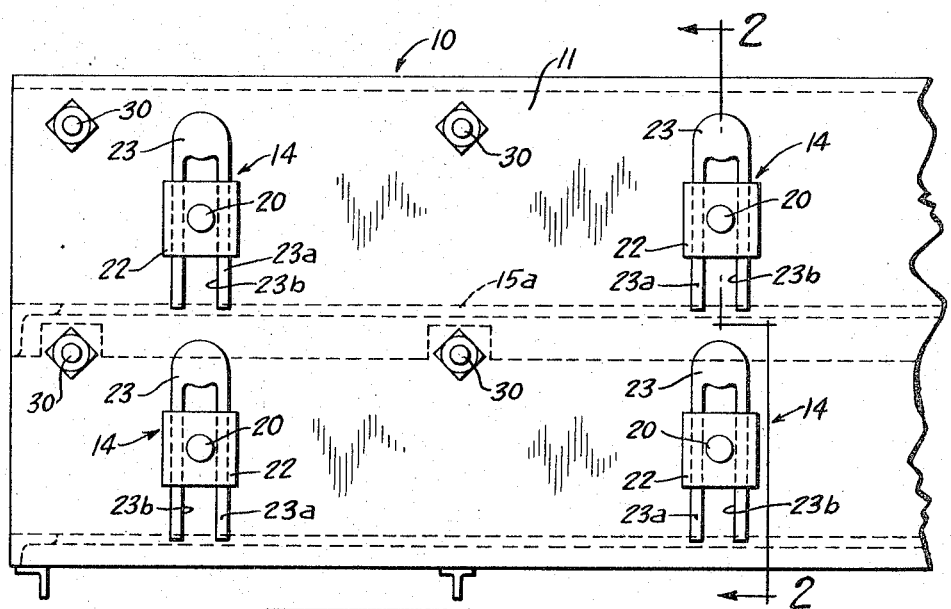
FIGURE 1 is a fragmentary elevational view of the framework of a screening apparatus embodying the invention.

Referring now to the drawings, FIGURE 1 discloses screening apparatus 10, comprising generally siderails or framework 11 provided with a plurality of openings 12 therealong through which individual bolts 20 are inserted to secure screen support plates 13 (FIGURE 2) that extend longitudinally along the siderail or frame 11. A pair of screens 15 and 16 are shown as fastened to the framework 11 and tensioned by a plurality of screen tensioning devices 14. The screens are ordinarily of different mesh and may require different tensioning dependent upon the nature of the screening process. Also, the number of screens in a box or frame will be dependent upon the nature of the screening desired, and the specific disclosure of two screens to illustrate the invention is for descriptive purposes only.

Figure 2:
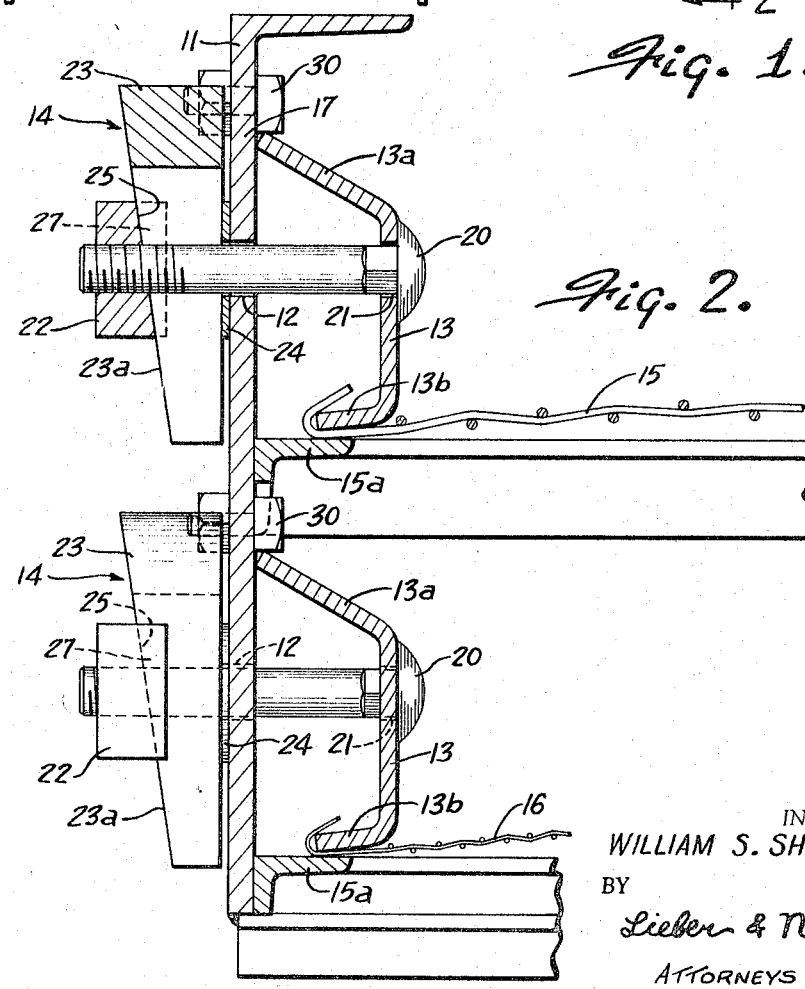
FIGURE 2 is an enlarged sectional view taken along line 2—2 of FIGURE 1.

The longitudinally extending screen support plates 13 are formed of metal stamped, punched or extruded so as to have a channel shape as disclosed in FIGURE 2 with an upper flange 13a of each support plate 13 adapted to engage the interior surface of the adjacent frame side member 17. The lower flange 13b of the support plate 13 is, in turn, adapted to engage and hold the hooked edge of the screen 15 as shown. Another screen support plate similar to plate 13 is located on the opposing frame side member (not shown). Thus, the screens 15 and 16 are held and tensioned between support plates 13. The support plates 13 are secured to frame side members 17 as by bolts 20 inserted through openings 21 in said support plates and through openings 12 in the frame side members. The bolts 20 are secured to hold and tension screens 15 and 16 as will be hereinafter described.

Referring to FIGURE 2, the relationship of the screen tensioning devices 14 to the screen support plates 13 is readily apparent, the screens 15 and 16 being shown as supported and tensioned within the siderails of box 11.

To prevent possible displacement and to provide positive positioning, the screens are held between lower part 13b of plate 13 and a longitudinally extending flange 15a secured along frame side member 17. Threaded nut members 22 are received on the threaded bolts 20 and may be rotated to thread them toward or away from the frame side member 17 a predetermined distance to allow bifurcated wedges 23 to be inserted between the frame and each of the threaded nut members 22, a washer 24 being preferably positioned against the frame siderail to provide a bearing for the wedge. The nuts 22 are each provided with an inwardly open groove or channel 27 having an inclined bottom surface 25 adapted to receive the inclined side surface 23a of wedge member 23; and in use, each of the members 22 are threaded toward the frame side member 17 a predetermined distance and proper adjustment is effected when the inclined surface 25 is in a position to allow insertion of one of the wedge members 23 to somewhat less than its fullest extent.

As shown, each of the wedge members 23 is bifurcated to provide a U-shaped member having an elongated slot 23b therein which is inserted past the shank of the bolt 20 to allow the legs of the wedge 23 to be received between the threaded member 22 and washer 24.

As the wedge 23 is thus driven into position the inclined edges 23a thereof coact with groove 27 of threaded member 22 and the bolt 20 is urged in a direction outwardly of the box or frame 11, thus causing screen support plate 13 to pivot about the edge of the upper flange 13a thereof which is maintained in engagement with frame side member 17 as by a plurality of longitudinally aligned bolts 30. This causes the screen to be tightened and tensioned as the lower flange 13b of plate 13 moves toward side member 17 carrying the edge of the screen therewith.

For removing the screen 15 or 16 for repair or replacement, it is only necessary to drive the bifurcated wedge members 23 out of engagement with the threaded members 22, unhook the screen from the flange 13b, and insert another screen so as to engage the lower part 13b of screen support plates 13, the wedge members 23 again being driven into position without need for further manipulation of threaded members 22. However, if for some reason or another, the dimensions of the screen should vary, or if the amount of tension required is different than that of the initial adjustment, the threaded members 22 can be threaded toward or away from side member 15 as required.

A slightly modified screen tensioning device 40 is shown in FIGURES 5 and 6 wherein a square-shanked headed pin 42 is provided with outwardly open inclined grooves 41 on opposite sides of the shank 42a remote from the head 42b. The bolt 42 is insertable through the screen support plate 13 and frame side member 17 as hereinabove described. However, in this embodiment, a retaining member 53 is provided which has a slot 54 therein open along one side for insertion over the bolt 42 within the grooves 41 thereof so as to present an inclined surface 55b for receiving the inclined faces 23a of the wedge 40. To allow for adjustment along the pin 42, a plurality of washers 37 are provided to present a bearing surface for the wedge lying substantially parallel to the frame side member 17, the number and thickness of the washers determining the available wedging space between the washers and the inclined bottom surface 55b of the channel 55 of member 53. The tensioning and securement of the screen in this case is also accomplished by driving the bifurcated wedge member 40 between washers 37 and the inclined surface 55b of the channel 55 of member 53, while the member 53 is held captive within the slots 41 to draw plate 13 toward its adjacent siderail 17 as hereinabove described with reference to FIGURES 1 to 4.

Thus, an improved device for securing and tensioning a screen within a box or frame has been provided in which a bifurcated wedge member is merely driven between a flange-forming member providing an inclined receiving groove and the frame side member to tension and secure the screen. Moreover, the wedge member may be rapidly and readily removed by driving the bifurcated wedge member from its wedged position on the pin or bolt to thereby relieve the tension on the screen. With the improved device, adjustments may be rapidly effected in a simple manner without special tools, and the bifurcated wedge is furthermore positively positioned and retained against inadvertent displacement with the legs thereof straddling the shank of the elongated pin or bolt member. Furthermore, since the bottom or base of the way 27 or 55 is inclined to correspond to the taper 23a of the legs of the wedge, the pulling force applied to the elongated force transmitting member 20, 42 extends axially of such member, and the force transmitting member thus cooperates with the flange 15a to exert a rectilinear tensioning pull on the screen.

Various modes of carrying out the invention are contemplated as being within the scope of the following claims particularly pointing out and distinctly claiming the subject matter which is regarded as the invention.

I claim:

1. A device for securing a screen support to the framework of a screening apparatus and for applying tension to the screen supported thereby, said device comprising, an elongated member having a shank extending through aligned apertures in the screen support and the adjacent framework, a head on one end of said shank seated against the screen support, a flange-forming member having a rectilinear bearing surface extending transversely thereacross, means on said shank remote from said head for removably receiving said flange-forming member with the bearing surface thereof facing the framework and angularly disposed relative thereto, and a bifurcated wedge having the legs thereof tapered to provide rectilinear bearing surfaces, said legs being freely insertable between said flange-forming member and the adjacent framework with the tapered legs of said wedge straddling the shank and the rectilinear bearing surfaces of said legs seated against the rectilinear bearing surface of said flange-forming member to draw said shank outwardly and thereby apply tension to the screen through the screen support.

2. A screen tensioning device according to claim 1, wherein the flange-forming member is channel-shaped to provide a recessed way for the legs of the bifurcated wedge.

3. A screen tensioning device according to claim 1, wherein means is provided for varying the spacing between the flange-forming member and the adjacent framework for reception of the bifurcated wedge.

4. A device for securing a screen support to the framework of a screening apparatus and for applying tension to the screen supported thereby, said device comprising, an elongated member having a threaded shank extending through aligned apertures in the screen support and the adjacent framework, a head on one end of said shank seated against the screen support, a flange-forming member having threaded engagement with said shank for adjustment therealong, said flange-forming member also having a tapered rectilinear bearing surface extending thereacross and facing the screen support, and a bifurcated wedge having the legs thereof tapered to provide rectilinear bearing surfaces, said legs being freely insertable between said flange-forming member and the adjacent framework with the tapered legs of said wedge straddling the shank the rectilinear bearing surfaces of said legs seated against the rectilinear bearing surface of said flange-forming member to draw said shank outwardly and thereby apply tension to the screen through the screen support.

5. A screen tensioning device according to claim 4, wherein the flange forming member is channel-shaped to provide a way facing the framework for receiving the legs of the bifurcated wedge.

6. A screen tensioning device according to claim 5, wherein the bottom of the way is inclined an amount corresponding to the taper of the legs of the wedge to thereby cause a direct axial force to be placed on the elongated member as the wedge is inserted.

7. A device for securing a screen support to the framework of a screening apparatus and for applying tension to the screen supported thereby, said device comprising, an elongated member having a shank extending through aligned apertures in the screen support and the adjacent framework, a head on one end of said shank seated against the screen support, a said shank having a pair of oppositely opening grooves therein angularly inclined relative to the framework and located remote from said head, a flange-forming member having a rectilinear bearing surface and being removably receivable in the grooves of said shank with the bearing surface thereof facing the framework, and a bifurcated wedge having the legs thereof tapered to provide rectilinear bearing surfaces, said legs being freely insertable between said flange-forming member and the adjacent framework to straddle the shank with the rectilinear bearing surfaces of said legs seated against the rectilinear bearing surface of said flange-forming member to draw said shank outwardly and thereby apply tension to the screen through the screen support.

8. A screen tensioning device according to claim 7 wherein the flange-forming member is channel-shaped and the grooves in the shank are inclined to correspond to the taper of the legs of the wedge.

9. A screen tensioning device according to claim 7, wherein the shank of the elongated member is a polygonal cross-section and the flange-forming member has a slot opening along one of its side edges to provide for reception thereof within the grooves of the shank.

References Cited by the Examiner

UNITED STATES PATENTS

| | | | |
|---|---|---|---|
| 2,582,657 | 1/1952 | Serner | 85—32 X |
| 3,036,487 | 5/1962 | Hughes | 85—7 |
| 3,092,573 | 6/1963 | Lambert et al. | 209—403 |
| 3,186,547 | 6/1965 | Behnke | 209—403 |

HARRY B. THORNTON, *Primary Examiner.*

L. H. EATHERTON, *Assistant Examiner.*